United States Patent [19]

Dwyer et al.

[11] 4,357,233
[45] Nov. 2, 1982

[54] CATALYTIC CONVERSION WITH ZEOLITE ZSM-39

[75] Inventors: Francis G. Dwyer, West Chester, Pa.; Edwin E. Jenkins, Woodstown, N.J.

[73] Assignee: Mobil Oil Corporation, New York, N.Y.

[21] Appl. No.: 254,698

[22] Filed: Apr. 16, 1981

Related U.S. Application Data

[60] Division of Ser. No. 156,905, Jun. 6, 1981, Pat. No. 4,287,166, which is a continuation-in-part of Ser. No. 84,683, Oct. 15, 1979, abandoned.

[51] Int. Cl.³ .............. C10G 11/02; C10G 35/06; C10G 47/02
[52] U.S. Cl. .............. 208/109; 208/46; 208/110; 208/111; 208/118; 208/119; 208/120; 208/134; 208/135; 585/520; 585/533; 585/734; 585/739
[58] Field of Search .............. 208/46, 111, 120, 135, 208/109, 110, 118, 119, 134; 585/446, 475, 481, 520, 533, 734, 739; 423/328, 329, 326; 252/431 N, 455 Z

[56] References Cited

U.S. PATENT DOCUMENTS

| | | | |
|---|---|---|---|
| 3,709,979 | 1/1973 | Cho | 423/328 |
| 3,832,449 | 8/1974 | Rosinski et al. | 423/328 |
| 3,947,482 | 3/1976 | Albers et al. | 260/448 C |
| 3,992,466 | 11/1976 | Plank et al. | 208/135 |
| 4,061,724 | 12/1977 | Grose et al. | 423/335 |
| 4,104,151 | 8/1978 | Rubin et al. | 208/111 |
| 4,104,294 | 8/1978 | Grose et al. | 252/431 N X |
| 4,105,451 | 8/1978 | Plank et al. | 208/111 |
| 4,116,813 | 9/1978 | Rubin et al. | 208/120 X |
| 4,151,189 | 4/1979 | Rubin et al. | 423/329 |

FOREIGN PATENT DOCUMENTS

| | | |
|---|---|---|
| 14059 | 8/1980 | European Pat. Off. . |
| 2836076 | 3/1979 | Fed. Rep. of Germany . |
| 2002733 | 2/1979 | United Kingdom . |

*Primary Examiner*—Edward J. Meros
*Attorney, Agent, or Firm*—C. A. Huggett; C. J. Speciale; G. W. Allen

[57] ABSTRACT

A new porous zeolite, a method of making same and the use thereof in catalytic conversion of organic compounds. The new product has a composition, expressed in terms of moles of anhydrous oxides per 100 moles of silica as follows:

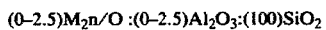

$$(0-2.5)M_{2n}/O : (0-2.5)Al_2O_3 : (100)SiO_2$$

wherein M is at least one cation having a valence n and wherein the zeolite is characterized by the distinctive X-ray powder diffraction pattern as shown in Table 1 herein. The new zeolite is prepared from a reaction mixture comprising a source of silica, a source of organic compounds of Group VB, alkali metal cations, water and with or without a source of alumina.

11 Claims, No Drawings

CATALYTIC CONVERSION WITH ZEOLITE ZSM-39

CROSS REFERENCE TO RELATED APPLICATIONS

This application is a division of application Ser. No. 156,905 filed June 6, 1981, now U.S. Pat. No. 4,287,166 which is a continuation-in-part of application Ser. No. 084,683, filed Oct. 15, 1979, now abandoned.

BACKGROUND OF THE INVENTION

1. Field of the Invention

This invention relates to a novel porous zeolite designated as ZSM-39, to a method for its preparation and to its use in catalytic conversion of organic compounds.

2. Description of the Prior Art

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as Ca/2, Sr/2, Na, K or Li is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), and zeolite ZSM-11 (U.S. Pat. No. 3,709,979), merely to name a few.

The $SiO_2/Al_2O_3$ mole ratio of a given zeolite is often variable. For example, zeolite X can be synthesized with $SiO_2/Al_2O_3$ mole ratio of from 2 to 3; zeolite Y, from 3 to about 6. In some zeolites the upper limit of $SiO_2/Al_2O_3$ mole ratio is unbounded. ZSM-5 is one such example wherein $SiO_2/Al_2O_3$ mole ratio is at least five. U.S. Pat. No. 3,941,871 discloses a crystalline metal organosilicate essentially free of aluminum and exhibiting an X-ray diffraction pattern characteristic of ZSM-5 type aluminosilicates. U.S. Pat. Nos. 4,061,724, 4,073,865 and 4,104,294 describe microporous, crystalline silicas or organosilicates.

SUMMARY OF THE INVENTION

The present invention is directed to a novel porous zeolite, designated as ZSM-39, a method for its preparation, and the conversion of organic compounds contacted therewith.

The porous zeolite composition ZSM-39 can be identified, in terms of moles of anhydrous oxides per 100 moles of silica as follows:

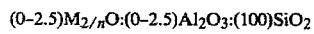

$(0-2.5)M_{2/n}O:(0-2.5)Al_2O_3:(100)SiO_2$ wherein M is at least one cation having a valence n, and wherein the zeolite is characterized by the distinctive X-ray diffraction pattern as shown in Table 1 herein.

In the as synthesized form, the zeolite has a formula, after dehydration, in terms of moles of oxides, per 100 moles of silica, as follows:

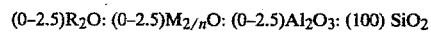

$(0-2.5)R_2O: (0-2.5)M_{2/n}O: (0-2.5)Al_2O_3: (100) SiO_2$ wherein M is an alkali or alkaline earth metal and $R_2O$ is the oxide form of an organic compound of Group VB element of the Periodic Chart of the Elements (Fisher Scientific Company, Cat. No. 5-702-10, 1978), preferably nitrogen or phosphorous, containing at least one alkyl or aryl group having between 1 and 7 carbon atoms, preferably between 2 and 5 carbon atoms, preferably containing at least one ethyl group and still more preferably $R_2O$ is a quaternary ammonium compound.

Members of the new family of zeolites may have small amounts of Al, Fe and/or Cr in positions of tetrahedral substitution within the silica lattice. To this extent, the latter possesses a negative change, one excess electron for each atom substitution, which is balanced by cations. These catins may be replaced at least in part, by other ions using conventional ion exchange techniques. Due to pore blockage, in some cases, by the $R_2O$ species it may be necessary to pre-calcine the zeolite prior to ion-exchange. Ions introduced to replace the original alkali, alkaline earth and/or organic cations may be any that are desired so long as they can pass through the channels within the zeolites. Especially desired replacing ions are those of hydrogen, ammonium and metals of Groups I through VIII of the Periodic Chart. Among the metals those particularly preferred are rare earth metals, manganese, zinc and those of Group VIII of the Periodic Chart.

Catalytically-active members of the family of zeolites disclosed and claimed herein have a definite X-ray diffraction pattern which distinguishes them from other crystalline materials.

The X-ray diffraction pattern of the zeolite of the present invention has the following characteristic values:

TABLE 1

| Interplanar Spacing D (Å) | Relative Intensity |
| --- | --- |
| 11.2 ± 0.2 | W |
| 6.8 ± 0.15 | M |
| 5.8 ± 0.1 | VS |
| 5.6 ± 0.1 | VS |

TABLE 1-continued

| Interplanar Spacing D (Å) | Relative Intensity |
|---|---|
| 4.8 ± 0.1 | M |
| 4.4 ± 0.1 | M |
| 3.95 ± 0.08 | M-S |
| 3.7 ± 0.08 | VS |
| 3.4 ± 0.07 | M-S |
| 3.3 ± 0.07 | VS |
| 3.2 ± 0.07 | W |
| 3.1 ± 0.06 | W |
| 3.0 ± 0.06 | W |
| 2.3 ± 0.05 | W |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these the relative intensities, $100I/I_o$, where Io is the intensity of the strongest line or peak, and d (obs.), the interplanar spacing in A, corresponding to the recorded lines, were estimated. The intensity in the table above is expressed as follows:
W=weak, M=medium, M-S=medium to strong, S=strong and VS=very strong.

Other cationic forms reveal substantially the same pattern with minor shifts in interplanar spacing and variation of relative intensity. Other minor variations can occur depending on the silica to alumina mole ratio of the particular sample as well as if it has been subjected to thermal treatment.

The zeolite of the present invention can be used either in the alkali metal form, e.g. the sodium form; the ammonium form; the hydrogen form or another univalent or multivalent cationic form. When used as a catalyst the zeolite will be subjected to thermal treatment to remove part or all of the organic constituent.

The zeolite can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition to the extent Al is in the structure, impregnated therein or intimately physically admixed therewith. Such component can be impregnated in or on to it such as for example, by, in the case of platinum, treating the zeolite with a solution containing a platinum metal-containing ion. Thus, suitable platinum compounds include chloroplatinic acid, platinous chloride and various compounds containing the platinum amine complex.

The above zeolite especially in its metal, hydrogen, ammonium, alkylammonium and arylammonium forms can be beneficially converted to another form by thermal treatment. This thermal treatment is generally performed by heating one of these forms at a temperature of at least 700° F. for at least 1 minute and generally not greater than 20 hours. While subatmospheric pressure can be employed for the thermal treatment, atmospheric pressure is desired for reasons of convenience. The thermal treatment can be performed at a temperature up to about 1700° F. The thermally treated product is particularly useful in the catalysis of certain hydrocarbon conversion reactions.

The new zeolite when employed either as an adsorbent or as a catalyst in one of the aforementioned processes should be dehydrated, at least partially. This can be done by heating to a temperature in the range of 400° F. to 1100° F. in an atmosphere, such as air, nitrogen, etc. and at atmospheric, subatmospheric or superatmospheric pressures for between 1 and 48 hours. Dehydration can also be performed at room temperature merely by placing ZSM-39 in a vacuum, but a longer time is required to obtain a sufficient amount of dehydration.

The new zeolite can be prepared from a reaction mixture containing a source of silica (an oxide of silicon); $R_2O$; an alkali metal oxide, e.g. sodium; water; and optionally alumina, and having a composition in terms of mole ratios of oxides, falling within the following ranges:

| REACTANTS | BROAD | PREFERRED |
|---|---|---|
| $R_2O/SiO_2$ | .01-100 | .05-20 |
| $M_2N^O/SiO_2$ | .01-10 | .02-5 |
| $Al_2O_3/SiO_2$ | 0-1.0 | 0-.5 | wherein $R_2O$ is the oxide form of an organic compound of an element of Group VB of the Periodic Chart and can be a compound containing one ethyl group, M is an alkali or alkaline earth metal, and maintaining the mixture, at crystallization temperatures, until crystals of the zeolite are formed. When prepared without alumina, any alumina that may be found in the product is introduced as an impurity in some other component of the crystallization medium. A material prepared without added alumina and if prepared in such a manner so as there is no aluminum present as an impurity, would result in the formation of a substance which would have no ion-exchange capability, since it contained no aluminum. Such substance would be considered a "zeolite" for the purposes of this disclosure.

DESCRIPTION OF PREFERRED EMBODIMENTS

In preparing the new zeolite of this invention, the preferred alkali metal oxide is sodium and the preferred source of $R_2O$ is tetraethylammonium (TEA) ions or n-propylamine, with, preferably, tetramethylammonium ions added in varying amounts to the reaction mixture.

Crystallization is performed in the temperature range from 200° F. generally, but at lower temperature e.g. less than 200° F., crystallization time is longer. These times vary from about 6 hrs to 90 days. Thereafter, the crystals are separated from the liquid and recovered. The composition can be prepared utilizing meterials which supply the appropriate oxide. Such compositions include sodium silicate, silica hydrosol, silica gel, silicic acid and sodium hydroxide. The organic compounds can be any element of Group VB such as nitrogen, phosphorus, arsenic, antimony. The preferred compounds are quaternary compounds generally expressed by the following formula:

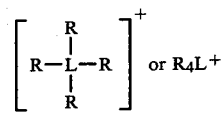

Wherein L is an element of Group VB of the Periodic Chart, and each R is an alkyl or aryl group having between 1 and 7 (preferably 2-5) carbon atoms, preferably at least one R group is an ethyl group. While normally each alkyl or aryl group will be the same, it is not necessary that each group have the same number of carbon atoms in the chain. In preparing an ammonium species, the organic substituted ammonium chloride or hydroxide is useful. In preparing the phosphonium species of the zeolite, tetraethylphosphonium chloride is particularly desirable as a means of incorporating the quaternary metal compound in the zeolite. The other elements of Group VB behave similarly and thus zeolites containing the same can be prepared by the same manipulative procedure substituting the other Group VB metal for phosphorous. It should be realized that the oxide can be supplied from more than one source. The reaction mixture can be prepared either batchwise or continuously. Crystal size and crystallization time of the new zeolite composition will vary with the nature of the reaction mixture employed and the crystallization conditions.

The quaternary compounds need not be used as such. They may be produced in situ by the addition of the appropriate precursors. These precursors comprise a compound characterized by the formula $R_1R_2R_3L$ where $R_1$, $R_2$ and $R_3$ are selected from alkyl, substituted alkyl, aryl, substituted aryl, cycloalkyl, substituted cycloalkyl and hydrogen and L is an element of Group VB and a compound of the formula $R_4L$ where $R_4$ is alkyl, substituted alkyl, cycloakyl, substituted cycloalkyl, aryl and substituted aryl and L is an electronegative group. According to a special embodiment of the invention, the method of the invention can be practiced using the compound $R_1R_2R_3L$ alone. Thus, in specific embodiments one may use as the source of $R_2O$, amines or phosphines either primary, secondary or tertiary as well as diamines without addition of any $R_4X$.

As indicated above, the zeolites prepared by the instant invention are formed in a wide variety of particular sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the zeolite can be extruded before drying or dried or partially dried and then extruded.

In the case of many catalysts it is desired to incorporate the new zeolite with another material resistant to the temperatures and other conditions employed in organic conversion processes. Such materials include active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the new zeolite, i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials have been incorporated into naturally-occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powderlike materials. These clay binders have been employed normally only for the purpose of improving the crush strength of the catalyst.

Naturally-occurring clays which can be composited with the new zeolite include the montmorillonite and kaolin family, which families include the subbentonites, and the kaolins commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the new zeolite also include inorganic oxides, notably alumina.

In addition to the foregoing materials, the zeolite can be composited with a porous matrix material such as silica-alumina, silica-magnesia, silica-zirconia, silica-thoria, silica-beryllia, silica-titania as well as ternary compositions such as alumina-thoria, silica-alumina-zirconia, silica-alumina-magnesia and silica-magnesia-zirconia. The relative proportions of finely divided crystalline zeolite and inorganic oxide gel matrix very widely with the total zeolite content ranging from about 1 to about 90 percent by weight and more usually, particularly when the composite is prepared in the form of beads, in the range of about 2 to about 80 percent by weight of the composite.

Employing a catalytically active form of the composition of this invention containing a hydrogenation component, heavy petroleum residual stocks, cycle stocks, and other hydrocrackable charge stocks can be hydrocracked at temperatures between 400° F. and 825° F. using molar ratios of hydrogen to hydrocarbon charge in the range between 2 and 80. The pressure employed will vary between 10 and 2,500 psig and the liquid hourly space velocity between 0.1 and 10.

A catalytically active form of the composition of this invention can be employed for catalytic cracking, hydrocarbon cracking stocks can be cracked at a liquid hourly space velocity between about 0.5 and 50, a temperature between about 550° F. and 1100° F., a pressure between about subatmospheric and several hundred atmospheres.

Employing a catalytically active form of a member of the family of zeolites of this invention containing a hydrogenation componnt, reforming stocks can be reformed employing a temperature between 700° F. and 1000° F. The pressure can be between 100 and 1000 psig but is preferably between 200 and 700 psig. The liquid hourly space velocity is generally between 0.1 and 10, preferably between 0.4 and 4 and the hydrogen to hydrocarbon mole ratio is generally between 1 and 20 preferably between 4 and 12.

A catalytically active form of the composition of this invention can also be used for hydroisomerization of normal paraffins, when provided with a hydrogenation component, e.g., platinum. Hydroisomerization is carried out at a temperature between 200° F. and 700° F., preferably 300° F. to 550° F., with a liquid hourly space velocity between 0.01 and 2, preferably between 0.25 and 0.50 employing hydrogen such that the hydrogen to hydrocarbon mole ratio is between 1:1 and 5:1. Additionally, the catalyst can be used for olefin isomerization employing temperatures between 30° F. and 700° F.

Other reactions which can be accomplished employing a catalytically active form of the composition of this invention with or without a metal, e.g., platinum, include hydrogenation-dehydrogenation reactions and desulfurization reactions, olefin polymerization (oligomerization), aromatics alkylation, aromatics isomerization, disproportionation, transalkylation, and other organic compound conversion such as the conversion of alcohols (e.g. methanol to hydrocarbon).

In order to more fully illustrate the nature of the invention and the manner of practicing same, the following examples are presented, wherein the zeolite materials of good crystallinity were prepared.

In the examples which follow whenever adsorption data are set forth for comparison of sorptive capacities for water, cyclohexane and n-hexane, they were determined as follows:

A weighted sample of the calcined zeolite was contacted with the desired pure adsorbate vapor in an adsorption chamber, evacuated to 1 mm and contacted with 12 mm Hg of water vapor and 20 mm Hg of cyclohexane and n-hexane vapor, pressures less than the vapor-liquid equilibrium pressure of the respective adsorbate at room temperature. The pressure was kept constant (within about ±0.5 mm) by addition of adsorbate vapor controlled by a manostat during the adsorption period which did not exceed about eight hours. As the adsorbate was adsorbed by the zeolite the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbent.

EXAMPLES 1 AND 2

In these examples, the starting gel mixture was prepared from colloidal silica (30% SiO$_2$), tetraethylammonium hydroxide (40%), tetramethylammonium hydroxide (25%), sodium aluminate and water. In Example 1, crystallization was achieved with stirring at 320° F. for 70 hours. In Example 2, crystallization was conducted without agitation at 310° F. for 330 hours. After crystallization, the solids were separated from any unreacted components by filtration and then water washed followed by drying at 230° F. The amounts of starting materials, identification of same and product compositions are listed in Table 2 herein.

EXAMPLES 3 AND 4

In these examples, the starting gel reaction mixture was prepared from sodium silicate (28.8% SiO$_2$, 8.9% Na$_2$O, 62% H$_2$O), obtained commercially as "Q-brand", tetramethylammonium chloride (50%), n-propylamine, sulfuric acid and water. In Example 3, crystallization was achieved with stirring at 320° F. for 53 hours. In Example 4, crystallization was attained without agitation at 320° F. for 48 hours. After crystallization, the solids were separated from any unreacted components by filtration and then water washed followed by drying at 230° F. The amounts of starting materials, identication of same product composition and adsorption data are set forth in Table 2 herein. The X-ray diffraction pattern of the zeolite produced according to the procedures of Example 4 is set forth in Table 3.

EXAMPLE 5

The dried product of Example 4 was calcined for 3 hours at 1000° F. in flowing nitrogen. The calcined product was then ion exchanged twice with a large excess of 0.1 N NaCl–0.1 N NaOH solution for two hours at room temperature. The resultant washed product had a sodium content of 0.21 wt.%. The x-ray diffraction of the resultant zeolite product of this Example is given in Table 4.

TABLE 2

|  | Example 1 | Example 2 | Example 3 | Example 4 |
|---|---|---|---|---|
| Composition of Charge |  |  |  |  |
| Q-Brand, g | — | — | 430 | 1718 |
| Coll. Silica, g. (30% SiO$_2$) | 400 | 100 | — | — |
| H$_2$SO$_4$ | — | — | 43 | 172 |
| NaAlO$_2$, g. | 0.5 | — | — | — |
| H$_2$O | 150 | — | 2000 | 8300 |
| TEAOH (40%), g. | 250 | 100 | — | — |
| TMAOH (25%), g. | 40 | 10 | — | — |
| TMACl (50%), g. | — | — | 150 | 600 |
| Propylamine, g. | — | — | 150 | 800 |
| Cryst. Condition |  |  |  |  |
| Temp., °F. | 320 | 310 | 320 | 320 |
| Time, Hr. | 70 | 330 | 53 | 48 |
| Agitation | Yes | No | Yes | Yes |
| Crystallinity | ZSM-39 +ZSM-5 | ZSM-39 | ZSM-12+ ZSM-39 | ZSM-39 |
| Product Composition, Wt. % |  |  |  |  |
| SiO$_2$ | 80.1 | — | 96.5 | 89.0 |
| Al$_2$O$_3$ | 0.23 | — | 0.20 | 0.23 |
| Na | 0.17 | — | 0.28 | 0.23 |
| N | 1.2 | — | 0.83 | 0.78 |
| C | 11.0 | — | 3.0 | 3.66 |
| Ash | 81.0 | — | 96.5 | 93.8 |
| Molar Ratio |  |  |  |  |
| SiO$_2$/Al$_2$O$_3$ | 590 | — | 819 | 657 |
| Sorptive Properties |  |  |  |  |
| H$_2$O, % | — | — | — | 0.4 |
| CyC$_6$, % | — | — | — | 0.3 |
| n-C$_6$, % | — | — | — | 0.2 |

TABLE 3
X-RAY DIFFRACTION DATA OF AS-SYNTHESIZED ZSM-39

| (DEGREES) | INTERPLANAR SPACING ANGSTROMS | RELATIVE INTENSITY |
|---|---|---|
| 7.93 | 11.15 | 5 |
| 12.95 | 6.84 | 23 |
| 13.72 | 6.45 | 2 |
| 14.35 | 6.17 | 1 |
| 15.21 | 5.83 | 93 |
| 15.88 | 5.58 | 69 |
| 16.58 | 5.35 | 1 |
| 18.37 | 4.83 | 47 |
| 20.03 | 4.43 | 36 |
| 21.20 | 4.19 | 2 |
| 21.55 | 4.12 | 1 |
| 22.51 | 3.95 | 48 |
| 22.87 | 3.89 | 2 |
| 23.08 | 3.85 | 2 |
| 23.90 | 3.72 | 100 |
| 24.55 | 3.63 | 1 |
| 26.04 | 3.42 | 42 |
| 27.25 | 3.27 | 84 |
| 27.63 | 3.23 | 10 |
| 29.16 | 3.06 | 12 |
| 30.26 | 2.954 | 8 |
| 33.05 | 2.710 | 2 |
| 35.63 | 2.520 | 9 |
| 37.15 | 2.420 | 1 |

TABLE 3-continued
X-RAY DIFFRACTION DATA OF AS-SYNTHESIZED ZSM-39

| (DEGREES) | INTERPLANAR SPACING ANGSTROMS | RELATIVE INTENSITY |
|---|---|---|
| 38.05 | 2.365 | 10 |
| 39.51 | 2.281 | 17 |
| 40.34 | 2.236 | 3 |
| 40.64 | 2.220 | 1 |
| 41.70 | 2.166 | 3 |
| 42.53 | 2.126 | 1 |
| 45.96 | 1.975 | 3 |
| 46.67 | 1.946 | 4 |
| 47.91 | 1.899 | 2 |
| 48.88 | 1.863 | 10 |
| 50.55 | 1.806 | 6 |
| 51.72 | 1.767 | 5 |
| 52.44 | 1.745 | 1 |
| 54.24 | 1.691 | 3 |
| 54.47 | 1.685 | 4 |
| 55.35 | 1.660 | 5 |
| 56.02 | 1.642 | 2 |
| 57.10 | 1.613 | 5 |
| 57.72 | 1.597 | 8 |
| 58.80 | 1.570 | 10 |
| 59.44 | 1.555 | 5 |

TABLE 4
X-RAY DIFFRACTION DATA OF NA-EXCHANGED ZSM-39

| (DEGREES) | INTERPLANAR SPACING ANGSTROMS | RELATIVE INTENSITY |
|---|---|---|
| 7.92 | 11.16 | 5 |
| 12.98 | 6.82 | 32 |
| 13.70 | 6.46 | 1 |
| 14.39 | 6.16 | 1 |
| 15.23 | 5.82 | 100 |
| 15.93 | 5.56 | 87 |
| 18.30 | 4.85 | 14 |
| 18.41 | 4.82 | 38 |
| 20.04 | 4.43 | 38 |
| 20.58 | 4.32 | 6* |
| 21.95 | 4.05 | 56* |
| 22.55 | 3.94 | 38 |
| 23.93 | 3.72 | 85 |
| 24.55 | 3.63 | 1 |
| 26.08 | 3.42 | 41 |
| 27.32 | 3.26 | 75 |
| 27.69 | 3.22 | 8 |
| 28.40 | 3.14 | 4* |
| 29.10 | 3.07 | 7 |
| 29.29 | 3.05 | 12 |
| 30.35 | 2.945 | 9 |
| 30.75 | 2.908 | 5* |
| 31.40 | 2.849 | 4* |
| 33.18 | 2.700 | 3 |
| 34.78 | 2.579 | 1 |
| 35.70 | 2.515 | 11 |
| 36.08 | 2.489 | 8* |
| 36.95 | 2.433 | 1 |
| 37.95 | 2.371 | 2 |
| 38.13 | 2.360 | 10 |
| 38.38 | 2.345 | 1 |
| 39.35 | 2.290 | 1 |
| 39.62 | 2.275 | 14 |
| 40.27 | 2.239 | 1 |
| 40.38 | 2.234 | 6 |
| 40.51 | 2.227 | 1 |
| 41.60 | 2.171 | 1 |
| 41.90 | 2.156 | 3 |
| 42.60 | 2.122 | 2 |
| 42.92 | 2.107 | 1 |
| 44.60 | 2.032 | 1 |
| 44.82 | 2.022 | 2 |
| 45.86 | 1.979 | 1 |
| 46.10 | 1.969 | 2 |
| 46.67 | 1.946 | 2 |
| 46.86 | 1.939 | 4 |
| 47.86 | 1.901 | 1 |
| 47.96 | 1.897 | 1 |
| 48.13 | 1.891 | 2 |
| 48.50 | 1.877 | 2 |
| 48.70 | 1.870 | 2 |
| 48.93 | 1.861 | 2 |
| 49.06 | 1.857 | 4 |
| 50.44 | 1.809 | 3 |
| 50.74 | 1.799 | 5 |
| 51.55 | 1.773 | 2 |
| 51.97 | 1.760 | 4 |
| 52.50 | 1.743 | 1 |
| 54.14 | 1.694 | 2 |
| 54.28 | 1.690 | 2 |
| 54.43 | 1.686 | 4 |
| 54.61 | 1.681 | 1 |
| 55.48 | 1.656 | 2 |
| 55.55 | 1.654 | 2 |
| 55.93 | 1.644 | 1 |
| 56.05 | 1.641 | 2 |
| 56.20 | 1.637 | 2 |
| 56.30 | 1.634 | 1 |
| 57.05 | 1.614 | 4 |
| 57.26 | 1.609 | 4 |
| 57.40 | 1.605 | 2 |
| 57.87 | 1.593 | 2 |
| 58.00 | 1.590 | 4 |
| 58.63 | 1.575 | 2 |
| 59.03 | 1.565 | 4 |
| 59.49 | 1.554 | 1 |
| 59.63 | 1.550 | 4 |

*INTENSITY ENHANCED BY CRYSTALLINE SILICA PHASES

What is claimed is:

1. A proess for catalytic cracking of a hydrocarbon cracking stock, which process comprises contacting said cracking stock under catalytic cracking conditions with a catalyst comprising a catalytically active form of a porous zeolite having a composition, expressed in terms of moles of anhydrous oxides, per 100 moles of silica, as follows:

$(0-2.5)M_{2/n}O:(0-2.5)Al_2O_3:(100)SiO_2$ wherein M is at least one cation having a valence n, and wherein said zeolite is characterized by a characteristic X-ray diffraction pattern as set forth in Table 1 of the specification.

2. A process for catalytic cracking of a hydrocarbon cracking stock, which process comprises contacting said cracking stock under catalytic cracking conditions with a catalyst comprising a catalytically active form of a porous zeolite having a composition, expressed in terms of moles of anhydrous oxides, per 100 moles of silica as follows:

$(0-2.5)R_2O:(0-2.5)M_{2/n}O:(0-2.5)Al_2O_3:100SiO_2$ wherein $R_2O$ is the oxide form of an organic compound which contains an element of Group VB of the Periodic Chart and at least one alkyl or aryl organic group having between 1 and 7 carbon atoms, at least one of which organic groups is ethyl, and M is an alkali or alkaline earth metal having a valence n, and wherein said zeolite is characterized by a characteristic X-ray diffraction pattern as set forth in Table 1 of the specification.

3. A process according to claim 2 wherein said catalytic cracking comprises hydrocracking of a hydrocrackable charge stock under hydrocracking conditions and wherein said catalyst also comprises a hydrogenation component.

4. A process for the catalytic reforming of a reforming stock, which process comprises contacting said reforming stock under catalytic reforming conditions with a catalyst comprising a hydrogenation component and a catalytically active form of a porous zeolite having a composition, expressed in terms of moles of anhydrous oxides, per 100 moles of silica, as follows:

$$(0-2.5)M_{2/n}O:(0-2.5)Al_2O_3:(100)SiO_2$$

wherein M is at least one cation having a valence n, and wherein said zeolite is characterized by a chracteristic X-ray diffraction pattern as set forth in Table 1 of the specification.

5. A process for the catalytic reforming of a reforming stock, which process comprises contacting said reforming stock under catalytic reforming conditions with a catalyst comprising a hydrogenation component and a catalytically active form of a porous zeolite having a composition, expressed in terms of moles of anhydrous oxides, per 100 moles of silica as follows:

$$(0-2.5)R_2O:(0-2.5)M_{2/n}O:(0-2.5)Al_2O_3:100SiO_2$$

wherein R₂O is the oxide form of an organic compound which contains an element of Group VB of the Periodic Chart and at least one alkyl or aryl organic group having between 1 and 7 carbon atoms, at least one of which organic groups is ethyl, and M is an alkali or alkaline earth metal having a valence n, and wherein said zeolite is characterized by a characteristic X-ray diffraction pattern as set forth in Table 1 of the specification.

6. A process for the catalytic hydroisomerization of a hydrocarbon charge stock comprising normal paraffins or olefins or mixtures thereof, which process comprises contacting said hydrocarbon charge stock under catalytic hydroisomerization conditions with a catalyst comprising a hydrogenation component and a catalytically active form of a porous zeolite having a composition, expressed in terms of moles of anhydrous oxides, per 100 moles of silica, as follows:

$$(0-2.5)M_{2/n}O:(0-2.5)Al_2O_3:(100)SiO_2$$

wherein M is at least one cation having a valence n, and wherein said zeolite is characterized by a characteristic X-ray diffraction pattern as set forth in Table 1 of the specification.

7. A process for the catalytic hydroisomerization of a hydrocarbon charge stock comprising normal paraffins or olefins or mixtures thereof, which process comprises contacting said hydrocarbon charge stock under catalytic hydroisomerization conditions with a catalyst comprising a hydrogenation component and a catalytically active form of a porous zeolite having a composition, expressed in terms of moles of anhydrous oxides, per 100 moles of silica as follows:

$$(0-2.5)R_2O:(0-2.5)M_{2/n}O:(0-2.5)Al_2O_3:100SiO_2$$

wherein R₂O is the oxide form of an organic compound which contains an element of Group VB of the Periodic Chart and at least one alkyl or aryl organic group having between 1 and 7 carbon atoms, at least one of which organic groups is ethyl, and M is an alkali or alkaline earth metal having a valence n, and wherein said zeolite is characterized by a characteristic X-ray diffraction pattern as set forth in Table 1 of the specification.

8. A process according to claim 1, 4 or 6 wherein M is selected from the group consisting of hydrogen, ammonium, or a metal of Groups II–VIII of the Periodic Chart or mixtures thereof.

9. A process according to claim 2, 3, 5 or 7 wherein the Group VB element of the R₂O compound is nitrogen or phosphorus and the organic group is an alkyl group.

10. A process according to claim 2, 3, 5 or 7 wherein R₂O comprises a tetraethylammonium compound and M is selected from the group consisting of sodium and potassium.

11. A process according to claim 1, 3, 4 or 6 wherein substantially no alumina is present in the zeolite.

* * * * *

UNITED STATES PATENT OFFICE
CERTIFICATE OF CORRECTION

Patent No. 4,357,233  Dated November 2, 1982

Inventor(s) Francis G. DWYER and Edwin E. JENKINS

It is certified that error appears in the above-identified patent and that said Letters Patent are hereby corrected as shown below:

In the Abstract, the formula:

$$"(0-2.5)M_2n/O:(0-2.5)Al_2O_3:(100)SiO_2"$$

should read:

$$--(0-2.5)M_{2/n}O:(0-2.5)Al_2O_3:(100)SiO_2--.$$

Column 2, line 42, "catins" should read --cations--.
Column 4, line 17, "$M_2N^0/SiO_2$" should read --$M_{2/n}O/SiO_2$--.

Column 4, line 47, after 200°F." insert --to 400°F.--.

Column 4, line 47, "temperature" should read --temperatures--.

Column 6, line 24, "very" should read --vary--.

Column 6, line 48, "componnt" should read --component--.

Signed and Sealed this

First Day of March 1983

[SEAL]

Attest:

GERALD J. MOSSINGHOFF

Attesting Officer  Commissioner of Patents and Trademarks